(12) United States Patent
Conway et al.

(10) Patent No.: US 7,226,235 B2
(45) Date of Patent: *Jun. 5, 2007

(54) JOINT FOR JOINING TWO COAXIAL SHAFTS

(76) Inventors: Terry Conway, 27603 100th St., Waseca, MN (US) 56093; Michael Bauer, 12644 615th Ave., Mapleton, MN (US) 56085; James Finseth, 303 Ridge Rd., Albert Lea, MN (US) 56007; Joel Matheson, 207 Lee Pl., Albert Lea, MN (US) 58007

(*) Notice: Subject to any disclaimer, the term of this patent is extended or adjusted under 35 U.S.C. 154(b) by 260 days.

This patent is subject to a terminal disclaimer.

(21) Appl. No.: 10/898,815

(22) Filed: Jul. 26, 2004

(65) Prior Publication Data

US 2006/0018708 A1    Jan. 26, 2006

(51) Int. Cl.
*B25G 3/20* (2006.01)
*F16B 7/00* (2006.01)

(52) U.S. Cl. .................... 403/371; 403/293; 473/299

(58) Field of Classification Search ............... 403/292, 403/293, 297, 298, 371; 473/298, 299
See application file for complete search history.

(56) References Cited

U.S. PATENT DOCUMENTS

| | | | | | |
|---|---|---|---|---|---|
| 3,891,212 | A | * | 6/1975 | Hill | 473/284 |
| 3,985,323 | A | * | 10/1976 | Gessler | 248/188.9 |
| 4,281,943 | A | * | 8/1981 | Viennot | 403/267 |
| 4,340,227 | A | * | 7/1982 | Dopkowski | 473/288 |
| 5,226,198 | A | * | 7/1993 | Martin | 15/230.11 |
| 5,251,767 | A | * | 10/1993 | Wiederer | 211/124 |
| 5,419,650 | A | * | 5/1995 | Hoshino | 403/370 |
| 5,431,465 | A | * | 7/1995 | Shibata | 294/1.1 |
| 5,857,921 | A | * | 1/1999 | Braly et al. | 473/289 |
| 6,702,534 | B2 | * | 3/2004 | Filipp | 411/58 |
| 6,776,724 | B1 | * | 8/2004 | Siemsglusz | 473/294 |
| 6,786,834 | B1 | * | 9/2004 | Matheson et al. | 473/299 |
| 2002/0022533 | A1 | * | 2/2002 | Churovich et al. | 473/296 |

* cited by examiner

*Primary Examiner*—Daniel P. Stodola
*Assistant Examiner*—Joshua T. Kennedy
(74) *Attorney, Agent, or Firm*—N Paul Friederichs

(57) ABSTRACT

A joint, usable as a component of a golf club, including an outer sleeve having a proximal end, a distal end, an outer surface and an inner surface; an inner sleeve having a proximal end, an outer surface in circumscribing contact with the inner surface of the outer sleeve, a slit, and a projection ring having an inner diameter; and an inner projection having a proximal end sized to be in circumscribing contact with the inner surface of the inner sleeve, a distal end, a key sized to be slidably fit in the slit of the inner sleeve, a proximal taper, a distal taper and a maximum diameter, the maximum diameter being larger than the inner diameter of the projection ring, the maximum diameter being selectively passable through the projection ring.

20 Claims, 4 Drawing Sheets

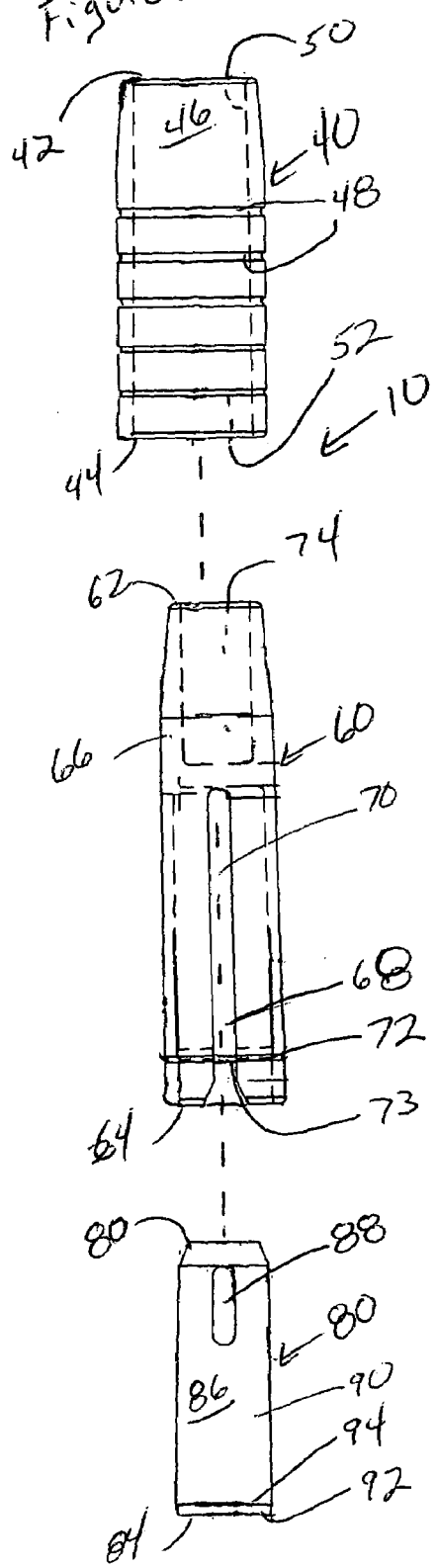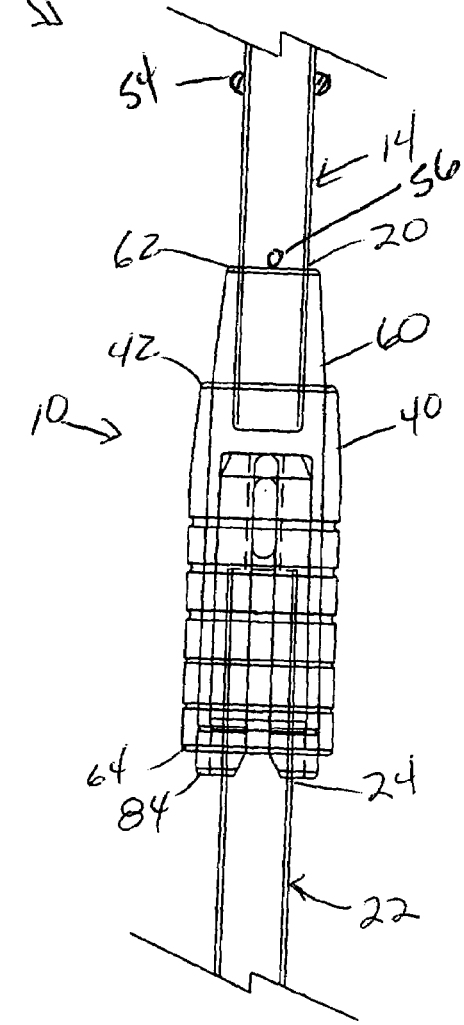

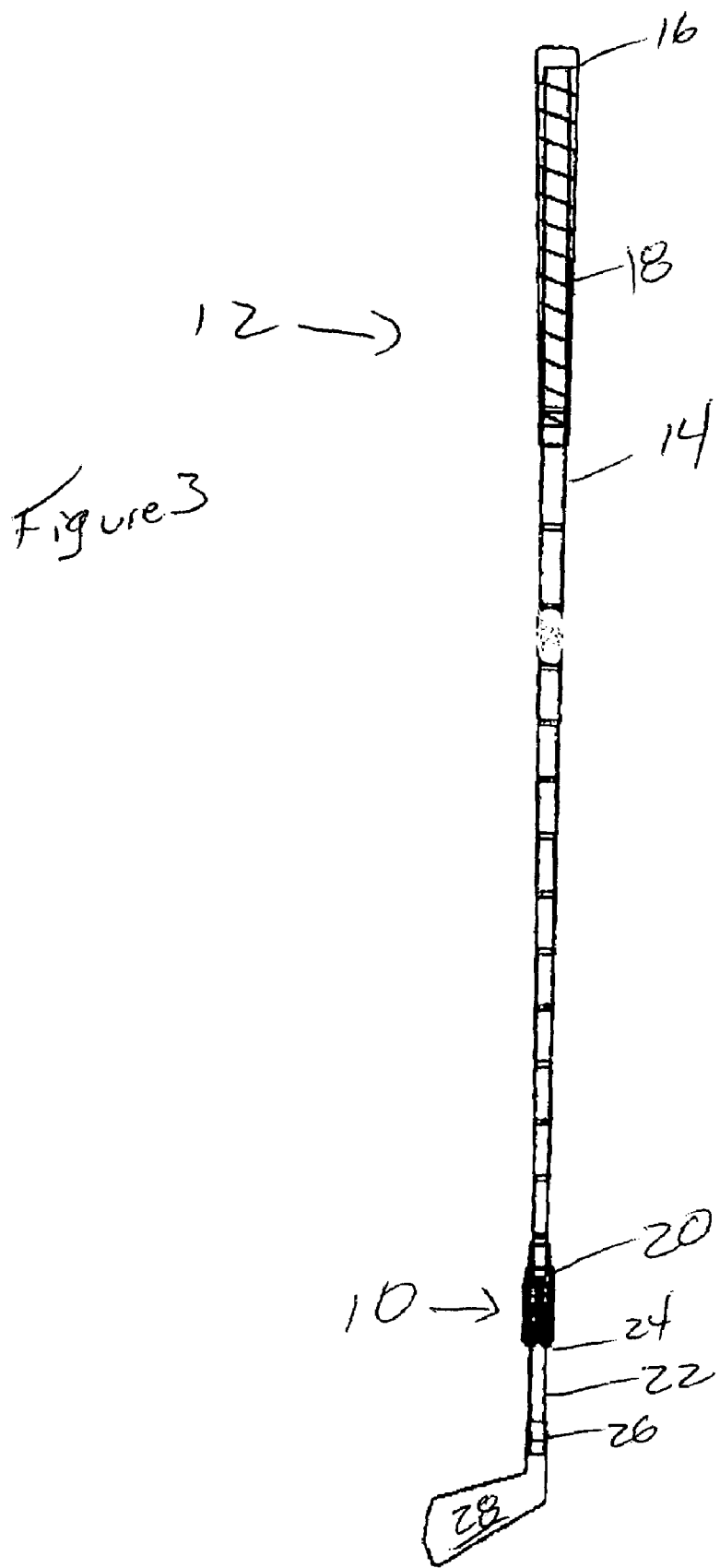

JOINT FOR JOINING TWO COAXIAL SHAFTS

BACKGROUND OF THE INVENTION

The present invention relates to joints or connectors and more particularly to joints between two shafts that may be selectively engaged/disengaged without the needs for tools and precludes rotation of the shafts relative to each other, claiming priority from U.S. patent application Ser. No. 10/459,183, filed Jun. 11, 2003 and entitled Joint Optionally Usable to Form a Jointed Golf Club.

Connectors come in a very wide variety of types for a wide variety of circumstances. Nails and screws are perhaps the most common, but are limited by types of materials with which they operate and generally require an overlapped joint. Other connectors are used in other circumstances.

A difficult joint to connect is two shafts or rods positioned end to end. A common connector in this circumstance is partial insertion of one shaft into the other as is commonly found in tent poles. Solid or thin diametered shafts cannot easily be joined in this manner and the joint allows one shaft to spin about its central axis while the other remains stationary. This type of connection is not suitable when the shafts must be held such that they do not rotate relative to each other, for instance when joining a two part golf club.

Some two piece golf clubs have been patented by earlier inventors. These clubs have a common problem of instability of the joint between the upper and lower shafts. As the golf club head strikes the ball, the club head is allowed to rotate. This results in errant shots and a non-usable set of golf clubs. The problem is focused on the joint connecting the two shafts. One shaft is allowed to rotate relative to the other shaft.

Moreover, many connectors require the use of tools, e.g., a screw driver for screws, which are not always available or convenient. Tools on the golf course are easily lost in the grassy fairways and roughs. Some connectors obviate this problem by being designed such that tools are unnecessary. For instance, the aforementioned manner of joining tent poles is one such connector.

What is needed is a connector for joining two poles or shafts that may preclude rotation of the shafts relative to each other. The joint should be of such construction as to be selectively removable at the behest of the user, but not at other times. The joint should further be connectable/disconnectable without the need for tools, specialized or common.

SUMMARY OF THE INVENTION

The present invention is a connector for joining two poles or shafts that precludes rotation of the shafts relative to each other. The joint is of such construction as to be selectively removable at the behest of the user, but not at other times. The joint is connectable/disconnectable without the need for tools, specialized or common.

A joint is provided, including an outer sleeve, an inner sleeve, and an inner projection. The outer sleeve may have a proximal end, a distal end, an outer surface and an inner surface. The inner sleeve may have a proximal end, an outer surface in circumscribing contact with the inner surface of the outer sleeve, a slit, and a projection ring. The projection ring has an inner diameter. The inner projection preferably has a proximal end sized to be in circumscribing contact with the inner surface of the inner sleeve, a distal end, a key sized to be slidably fit in the slit of the inner sleeve, a proximal taper, a distal taper and a maximum diameter. The maximum diameter desirably is larger than the inner diameter of the projection ring and yet the maximum diameter remains selectively passable through the projection ring.

Advantageously, the present invention allows for connection of two shafts performed without tools.

Also advantageously, the present invention joins two shafts and precludes rotation of the shafts relative to each other.

As still yet another advantage, the present joint as part of a golf club, garden tools or other connection of co-axial shafts overcomes the problem of rotation of the respective shafts relative to each other.

These and other advantages will become clear through reading the below description and review of the figures.

DESCRIPTION OF THE DRAWINGS

FIG. 1 is an exploded side view of the joint of the present invention partially shown in phantom;

FIG. 2 is an assembled side view of the present inventive joint partially shown in phantom;

FIG. 3 is an assembled side view of the present inventive joint incorporated into a jointed golf club;

Figure 4:
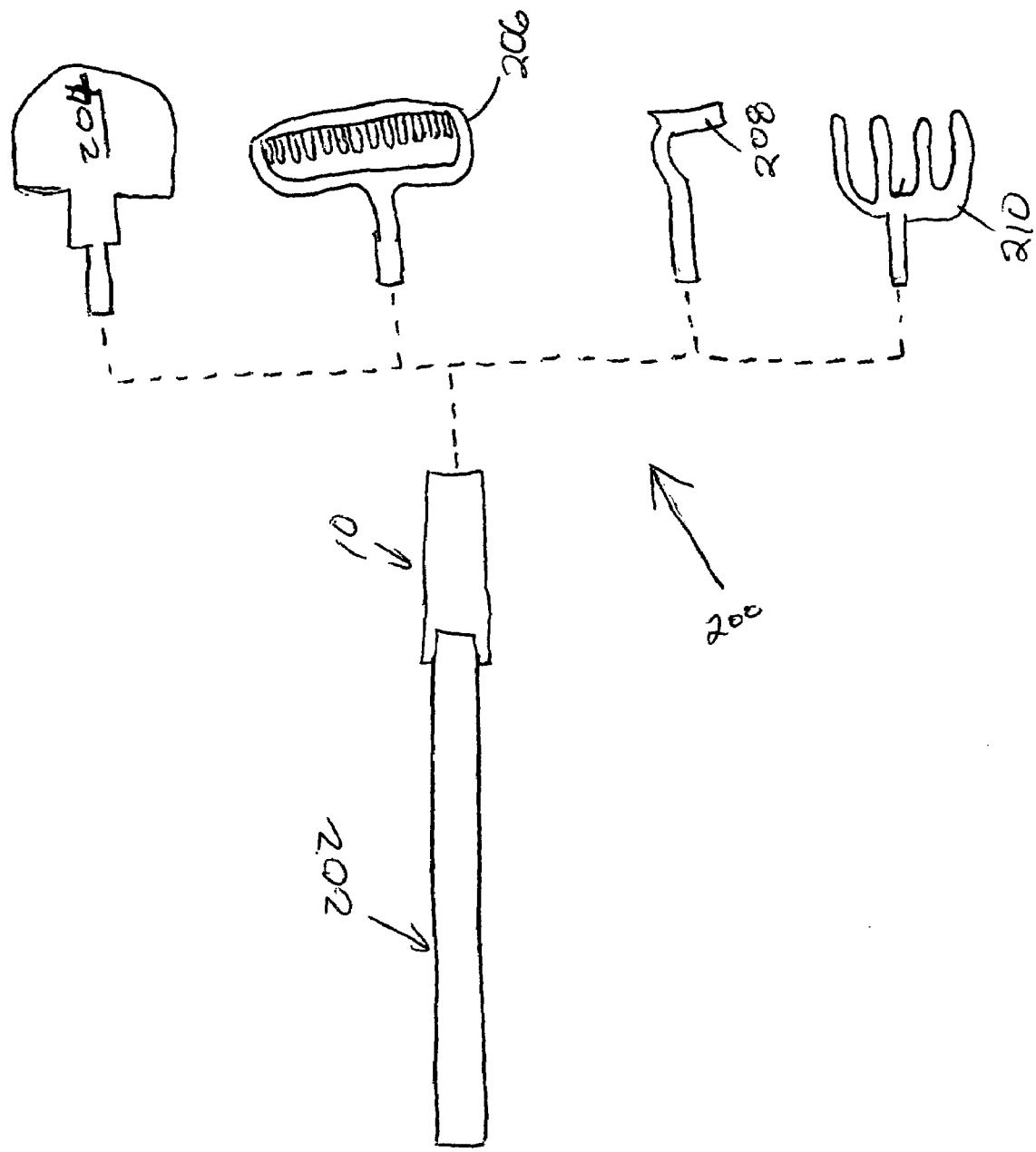
FIG. 4 is an exploded view showing the joint in use to secure a shaft to a variety of garden tools.

These drawings show the preferred embodiment of the present invention, are designed to aid in the understanding of the present invention, and are not to be used in any manner limiting the broad scope of protection that the inventor is entitled to receive under the laws of the United States of America.

DETAILED DESCRIPTION

The present inventive joint 10 is suitable for a variety of uses and is particularly useful in jointed golf clubs 12 and garden tool heads 200. The joint may be made of any suitable material, including, but not necessarily limited to, metal, metal alloys, plastics and composite material with the primary concern in material selection being that of strength for the application. The connector components may be made a wide variety of sizes, perhaps small enough to join wires and large enough to join large diameter poles. The joint 10 and golf club 12 will be described together, but one skilled in the art will recognize that the joint may be used to join tent poles, poles for reaching such as poles around swimming pools used for rescues, garden tools and poles for a variety of other uses. The golf club may include an upper shaft 14 and a lower shaft 22 joined with the joint 10. The joint 10 may include an outer sleeve 40, and inner sleeve 60, and an inner projection 80. These components are discussed further below.

The upper shaft 14 may have a proximal end 16 and a distal end 20. The proximal end 16 may be joined to a handle 18. Preferably, the handle 18 is of a type used in the field of golf clubs and may be made of rubber, polymer or leather. The shaft 14, itself, may be formed of materials commonly used in the field of golfing, including steel, metal alloys, graphite, and other composite materials.

The lower shaft 22 may have a proximal end 24 and a distal end 26. The distal end 26 may be joined to a club head 28. The club head 28 may be for a putter, one iron, two iron, three iron, four iron, five iron, six iron, seven iron, eight iron, nine iron, pitching wedge, sand wedge, lob wedge, driver, two wood, three wood, four wood, five wood, six wood, seven wood, eight wood, nine wood or any other club used by a golfer. The lower shaft 22, itself, may be formed of materials commonly used in the field of golfing, including steel, metal alloys, graphite, and other composite materials.

In another embodiment, the joint 10 is used to secure a variety of operable heads 200 to a shaft 202 perhaps to form garden or other hand tools. The operable heads 200, may include a shovel 204, a rake 206, a hoe, 208, a fork 210, and other known heads, including brooms. The heads may be stored in a tool box, belt, tool cart, or other carrier, thus eliminating the mess associated with storing such tools.

The joint 10 may have an outer sleeve 40, an inner sleeve 60, and an inner projection 80. The inner projection 80 is received within and selectively locks to the inner sleeve 60 with or without the outer sleeve 40. The outer sleeve 40 optionally secures the inner sleeve 60 to the inner projection 80, making them non-separable until the impact of the outer sleeve 40 is removed. Each component is described more fully below.

The outer sleeve 40 may have a proximal end 42, a distal end 44 an outer surface 46 and an interior surface 50. The interior surface 50 defines a bore 52 extending from the proximal end 42 to the distal end 44. The bore 52 preferably is sized to loosely and slidably receive the upper shaft 14 and snugly receive the inner sleeve 60. The outer surface 46 may define grooves 48 or other non-slip surface used for grasping the outer sleeve 40. A stop 54 may communicate between the upper shaft 12 and the outer sleeve 40 to preclude over-retraction. The stop 54 may be in a variety of forms including a ring of hardened material joined to the shaft 12 as shown, a liner inside the outer sleeve 40, or other manners. Likewise, a detent 56 or other lower stop, including a rubber or other non-slip liner inside the outer sleeve 40, a collar positioned between the outer sleeve 40 and the stop 54 may preclude disassembly of the joint 10 due to vibration or bumping in certain applications.

The inner sleeve 60 may have a proximal end 62, a distal end 64, an outer surface 66, an inner surface 68 and a shaft channel 74. The proximal end 62 may be joined to the distal end 20 of the upper shaft 14, perhaps with the upper shaft 14 extending into the shaft channel 74. A slit 70, or other means of expansion, may extend from the distal end 64 of the inner sleeve 60 toward the proximal end 62 thereof. The slit 70 should be accessible from the inner surface 68, e.g., groove, and may extend through to the outer surface 66 from the inner surface 68. Multiple slits 70 may be present and the slit(s) 70, among other purposes described below, may allow the internal diameter of the inner sleeve 60 to spread slightly at the behest of the user to allow the distal taper 92 of the inner projection 80 to meet a projection ring 72. The projection ring 72, with an internal diameter 73, may be disposed adjacent the distal end 64 and be suitable for interlocking with the inner projection 80. The inner sleeve 60 is sized to be in circumscribing contact with the interior surface 50 of the outer sleeve 40.

The inner projection 80 may have a proximal end 82, a distal end 84, an outer surface 86 and a key 88. The inner projection 80 desireably is sized to be in circumscribing contact with the inner surface 68 of the inner sleeve 60. The distal end 84 of the inner projection 80 preferably is joined with the proximal end 24 of the lower shaft 22. The key 88 can be sized to be slidably fit in the slit 70 in such a lock and key type manner to preclude rotation of the upper shaft 14 and the lower shaft 22 relative to each other. That is, the key 88 precludes rotation of the club head 28, during use of the golf club 12. Multiple keys 88 may interact with multiple slits 70. The inner projection 80 may define a shaft channel 74 for receipt of the proximal end 24 of the lower shaft 22.

Figure 5:
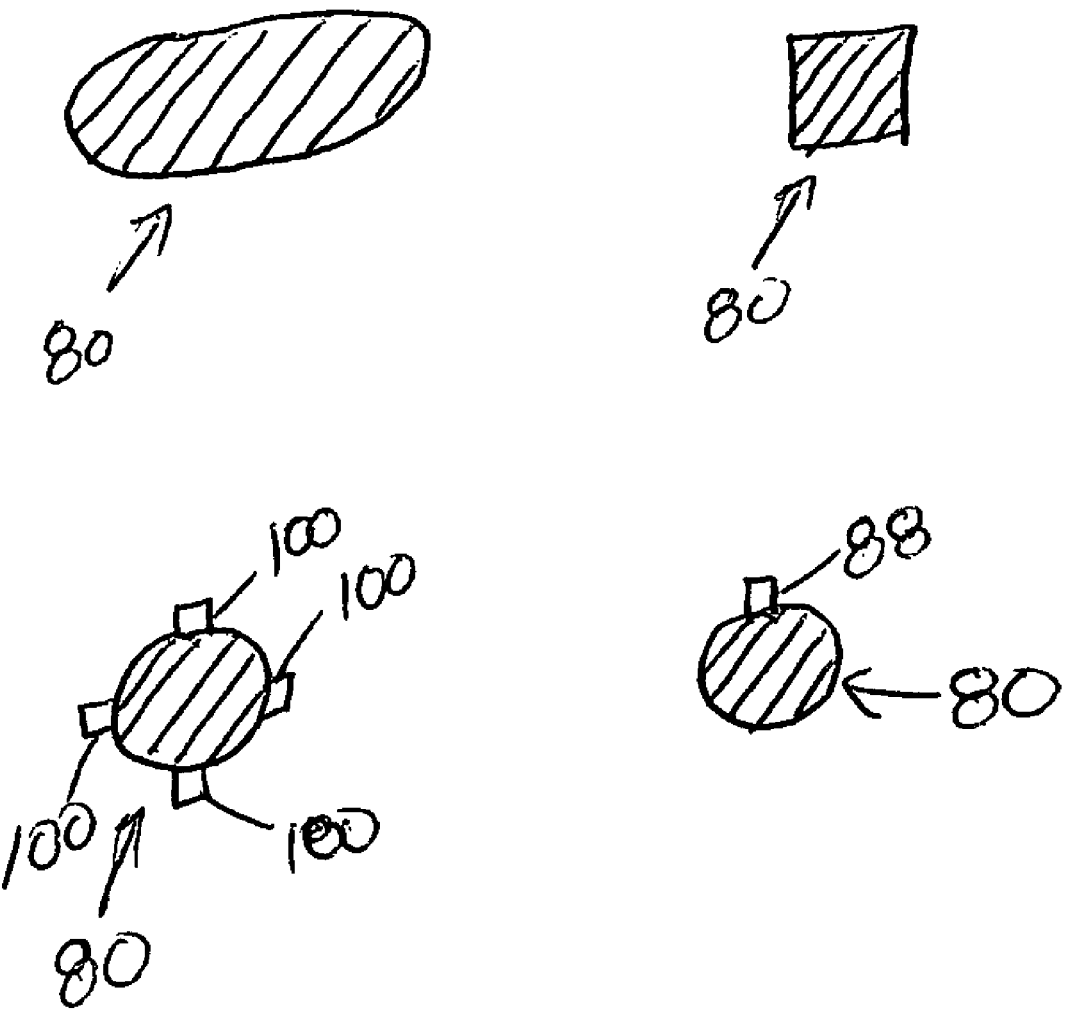
FIG. 5 is a cross-sectional view of a variety of different shaped inner projections.

Alternative fits, as indicated in FIG. 5, between the inner projection 80 and inner sleeve 60 may be used in lieu of the round cross-section with a key. The fit can be designed so as to preclude rotation between the inner projection 80 and sleeve 60 geometrically or with the use of key 88 or splines 100. FIG. 5 displays some of the possible cross-sectional shapes of the inner projection 80, including oval, square, round with splines 100 of round with a key 88. The inner sleeve 60 is still sized and shaped to snugly fit about the inner projection 80.

The outer surface 86 of the inner projection 80 may have a proximal taper 90, a distal taper 92 and a maximum diameter 94. The tapers 90, 92 provide the mechanism for selectively securing the inner sleeve 60 about the inner projection 80 with the projection ring 72 securing about the distal taper 92. The maximum diameter 94 may being approximately the same size as or slightly larger than an inner diameter 73 of the projection ring 72. However, the maximum diameter 94 preferably is selectively passable through the projection ring 72 perhaps through spreading of the slit 70.

In operation, a user may have a multitude of the lower shafts 22 joined to club heads 28 of different types of clubs sufficient to arrange a set of golf clubs 12 or operable heads 200 to form a wide array of tools. The user may also have an upper shaft 14 joinable to the variety of lower shaft 22 and club head 28 combinations with joint 10. In the compacted form, the set of clubs tools may be stored in a back pack or other case for easy transport. The user takes the upper shaft 14 and pulls the outer sleeve 40 of the joint 10 toward the proximal end 16 of the upper shaft 14. The key 88 of the inner projection 80 and the slit 70 of the inner sleeve 60 are aligned and the inner projection 80 is snugly inserted into the inner sleeve 60. The inner projection 80 is pressed into the inner sleeve 60 until the projection ring 72 passes over the maximum diameter 94 and engages the distal taper 92. The outer sleeve 40 is placed over the inner sleeve 60, preventing it from spreading and thereby precluding the projection ring 72 from sliding back over the maximum diameter 94. To disengage the upper and lower shafts 14, 22, the user simply moves the outer sleeve 40 toward the proximal end 16 of the upper shaft 14 and pulls the upper and lower shafts 14, 22 apart.

Although the present invention has been described with reference to preferred embodiments, workers skilled in the art will recognize changes may be made in form and detail without departing from the spirit and scope of the invention. For instance, those skilled in the art will see that the joint is useable to join co-axial shafts in a wide array of environments not merely limited to tools.

We claim:

1. A joint, comprising:
an upper shaft having a proximal end and a distal end;
a lower shaft having a proximal end and a distal end;
a joint having an outer sleeve, an inner sleeve, and an inner projection, the outer sleeve sized to be in circumscribing contact with an outer surface of the inner sleeve, the inner sleeve having a proximal end joined to the distal end of the upper shaft, an inner surface, a slit, and a projection ring, and the inner projection having a proximal end sized to be in circumscribing contact with the inner surface of the inner sleeve, a distal end joined with the proximal end of the lower shaft, a key sized to be slidably fit in the slit, a proximal taper, a distal taper and a maximum diameter, the maximum diameter being larger than an inner diameter of the projection ring, the maximum diameter being selectively passable through the projection ring.

2. The device of claim 1 wherein the outer sleeve defines a bore sized to slidably receive the upper shaft.

3. The device of claim 1 wherein the lower shaft is joined to an operable head.

4. A joint, comprising:
an outer sleeve, the outer sleeve having a proximal end, a distal end, an outer surface and an inner surface;
an inner sleeve, the inner sleeve having a proximal end, and an outer surface, the outer surface of the inner sleeve being in circumscribing contact with the inner surface of the outer sleeve, a slit, and a projection ring, the projection ring having an inner diameter; and
an inner projection, the inner projection having a proximal end sized to be in circumscribing contact with the inner surface of the inner sleeve, a distal end, a proximal taper, a distal taper and a maximum diameter, the maximum diameter being larger than the inner diameter of the projection ring, the maximum diameter being selectively passable through the projection ring.

5. The joint of claim 4 wherein further comprising structure precluding rotation between the inner sleeve and inner projection.

6. The joint of claim 5 wherein the structure is a key joined to the inner projection and receivable within the slit.

7. The joint of claim 5 wherein the structure is splines.

8. The joint of claim 5 wherein the structure is an interaction between a non-round perpendicular cross-section of the inner projection and a conforming opening of the inner sleeve.

9. The joint of claim 8 wherein the cross-section of the inner projection is elliptical.

10. The joint of claim 8 wherein the cross-section of the inner projection is square.

11. The device of claim 4 wherein the inner sleeve is joined to an upper shaft and the inner projection is joined to a lower shaft.

12. The device of claim 11 wherein the lower shaft is joined to an operable head.

13. A joint, comprising:
a sleeve, the sleeve having a proximal end, an inner surface, means for expansion, and a projection ring, the projection ring having an inner diameter; and
an inner projection, the inner projection having a proximal end sized to be in circumscribing contact with the inner surface of the sleeve, a proximal taper, a distal taper and a maximum diameter, the maximum diameter being larger than the inner diameter of the projection ring, the maximum diameter being selectively passable through the projection ring.

14. The device of claim 13 wherein the means for expansion is a slit.

15. The device of claim 13 further comprising means for precluding rotation between the sleeve and inner projection.

16. The device of claim 15 wherein the means for precluding rotation is a key.

17. The device of claim 15 wherein the means for precluding rotation is splines.

18. The device of claim 15 wherein the means for precluding rotation is a cross-sectional fit between the inner projection and the sleeve.

19. The device of claim 13 wherein the sleeve is joined to an upper shaft and the inner projection is joined to a lower shaft.

20. The device of claim 13 wherein the lower shaft is joined to an operable head.

* * * * *